United States Patent [19]
Metivier

[11] Patent Number: 5,214,285
[45] Date of Patent: May 25, 1993

[54] NIGHT VISION MODULE FOR A VIEWING AND AIMING SYSTEM

[75] Inventor: Philippe Metivier, Poissy, France

[73] Assignee: Societe D'Applications Generales, Paris, France

[21] Appl. No.: 832,846

[22] Filed: Feb. 10, 1992

[30] Foreign Application Priority Data

Feb. 8, 1991 [FR] France .................. 91 01479

[51] Int. Cl.⁵ .............................................. F41G 1/32
[52] U.S. Cl. .................................... 250/330; 358/113
[58] Field of Search .......................... 250/330; 358/113

[56] References Cited

U.S. PATENT DOCUMENTS 4,200,251 4/1980 Börjesson et al. ................ 244/3.13

FOREIGN PATENT DOCUMENTS 0399609 11/1990 European Pat. Off. .
2625081 12/1977 Fed. Rep. of Germany .
2580865 10/1986 France .
2084347 4/1982 United Kingdom .
2148663 5/1985 United Kingdom .

*Primary Examiner*—Constantine Hannaher
*Attorney, Agent, or Firm*—Larson and Taylor

[57] ABSTRACT

A night vision module is adaptable as an input stage on a daylight viewing and aiming device for constituting a system operational during night. It comprises an infrared imaging unit and a unit for reproducing an image of the field of view of the imaging unit on a screen for display in the input field of the daylight device which has fixed reference marks. The image reproducing unit has a generator for inlaying, in the image of the field, a plurality of marks having a predetermined position with respect to the optical axis of the module, out of the central aiming zone. The inlaid marks are so located as to be centered with respect to the fixed reference marks when the module is harmonized. The module further comprises potentiometers enabling to control the location of the image on the screen and to center the inlaid marks with respect to the reference marks.

7 Claims, 2 Drawing Sheets

NIGHT VISION MODULE FOR A VIEWING AND AIMING SYSTEM

BACKGROUND OF THE INVENTION

The invention relates to a night vision module which is adaptable, as an input stage, on a daylight viewing and aiming device, for constituting a system which is operational at night by simply adding the module to the device.

Such a night vision module is of interest regarding ergonomy, since night viewing is through the same optical channel as daylight viewing. Furthermore, the degree of precision with which the night module is mechanically located on the daylight device is without effect on the harmonisation of the complete system, if the night module is itself harmonised (i.e. if its input axis is parallel to its optical output axis), all the more since the night module generally constitutes an afocal device having a magnification of 1.

Night viewing modules are already known of the type comprising an infra-red imaging unit and a unit for reproducing an image of the field of view of the imaging unit on a small size screen (typically the bottom of a cathode ray tube) for display in the input field of the daylight device.

In such a module, the image reproducing unit frequently has such a nature that it is subject, as time elapses or due to temperature variations, to a shift which results in a harmonisation error due to a displacement of the image of the field of view on the screen and possibly due to a change in the magnification. If practically the second cause of error is negligible, this is not so for the first one.

SUMMARY OF THE INVENTION

It is consequently an object of the invention to provide a night vision module whose harmonisation can be achieved and restored simply.

For that purpose, the invention particularly provides a night vision module of the above-defined type, characterized in that the field has fixed reference marks, in that the image reproducing unit is arranged for inlaying, in the image of the field, marks having a predetermined position with respect to the optical input axis of the module, so located as to be centered with respect to the reference marks when the night vision module is harmonised, and in that the module comprises means for controlling the position of the image on the screen, enabling to center the inlaid marks with respect to the reference marks.

When the screen consists of the bottom of a cathode ray tube provided with means for line and frame scanning (raster scan) the means for controlling the position of the image may consist of means for shifting in the line direction and in the frame direction.

The invention will be better understood on reading the following description of a particular embodiment, given as a non-limiting example. The description refers to the accompanying drawings, wherein:

COMPLETE DESCRIPTION OF EMBODIMENTS

Figure 1:
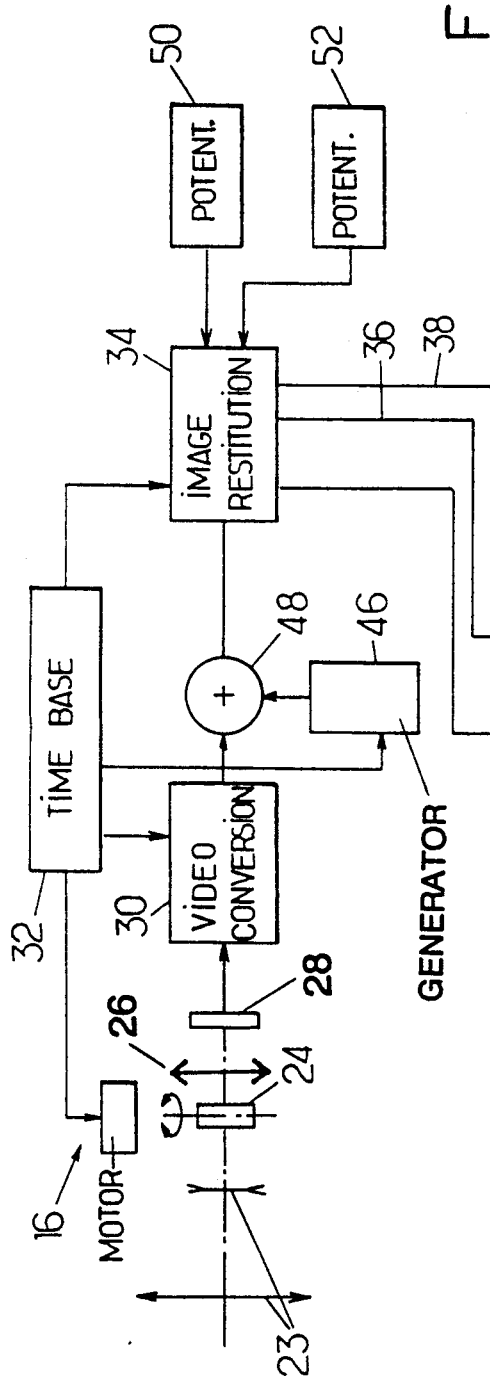
FIG. 1 is a schematic representation of a viewing and aiming device comprising a night vision module according to a particular embodiment of the invention.

The viewing and aiming system which is schematically shown in FIG. 1 comprises a daylight viewing and aiming device 10, which in the illustrated case consists of a telescope forming an image of the infinity and having an aiming reticle 12. The night vision module 16 constitutes an input stage for insertion on the optical path upstream of the telescope. The module 16 may be directly assembled on the equipment 10 and secured by quick action fasteners.

The module 16 may have a conventional general construction. The module represented on FIG. 1 may be regarded as having an infra-red imaging unit followed with a unit for reproducing an image on a cathode ray tube 18. An optical projection system 20 makes it possible to form an image which at the infinity for the telescope 10, and is inserted in the field of telescope 10 by a folding mirror 22 and a mirror 14.

The infra-red imaging unit comprises an optical unit which is conventional and comprises an afocal input system 23 represented as two lens, a scanning reflector 24 and an optical system 26 for focussing on an infra-red detector 28, for instance comprising a strip of sensors or light responsive positions.

The infra-red imaging unit further comprises a video conversion electronic unit 30, delivering output signals which sequentially represent the light values of all pixels in the field of view of the optical unit. A time base 32 makes it possible to synchronise operation of the electronic unit 30 and operation of the scanning reflector 24.

The image reproduction unit 34, also synchronised by the time base 30, delivers to the cathode unit 18 the luminance signal and the line and frame scanning signals, the latter two being on outputs 36 and 38.

It is not necessary to further describe the conventional parts of the module, since they are well known.

Figure 2:
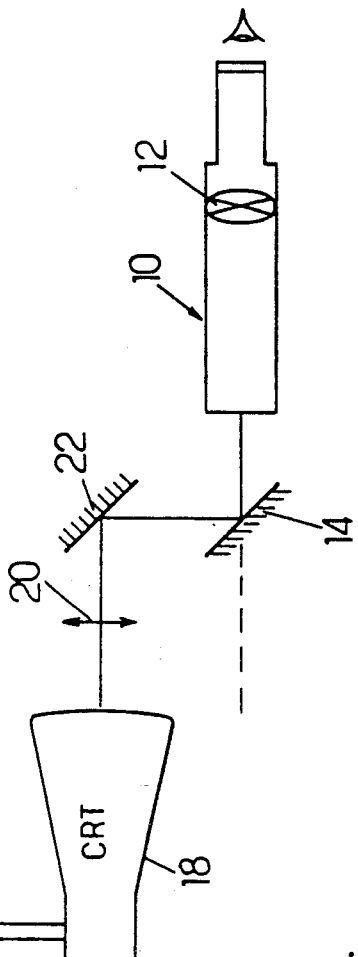
FIG. 2 is a schematic representation of the reference marks and of the inlaid marks which appear to the operator using the system of FIG. 1, for a particular representation of such marks.
Figure 2:
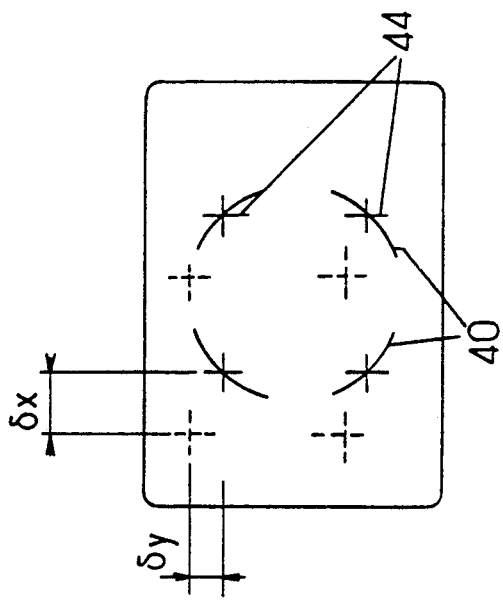

For implementing the invention, reference marks which are stationary with respect to the screen are necessary. As shown in FIG. 2, such marks may typically consist of segments 40 of a circle which is centered on the optical axis of the screen, formed by engraving the front surface of the bottom of the tube, or even the rear surface if the thickness of the bottom is low small for the parallax errors to be negligible. The condition may be considered as fulfilled for a tube having a bottom wall of some centimeters in diameter and a thickness lower than 2 mm.

The video signal delivered to the cathode ray tube should include data for generating, on the screen, inlaid marks having a disposition such that they are centered with respect to the reference marks when the module is harmonised. In the embodiment illustrated in FIG. 2, the marks consist of crossed lines 44 having a brightness higher than that of the other pixels. The marks may typically be inlaid by a generator 46 delivering signals which are summed to those delivered by the electronic unit 30, in an adder 48. Correct location of the inlaid marks is provided by synchronising generator 46 from data of the time base 32.

For centering the inlaid marks 44 with respect to the reference marks 40, the line scan and frame scan are shifted with manual control elements, which may be constituted by mere potentiometers 50 and 52. It would also be possible to carry out centering automatically, by conventional processes of optical deviation measurement.

The implementation of the invention immediately appears from the above description. When the night vision module has been mounted, then the inlaid marks appear, for instance at the locations indicated in dash lines in FIG. 2. Then it is sufficient to actuate potentiometers 50 and 52 for reducing deviations δx and δy to zero and for bringing the input optical axis of the night vision module in coincidence with the output optical axis thereof, which is stable in space and which is indicated by the reference marks 40.

In operation, coincidence of the marks may visually be monitored continuously and the references may be again centered with respect to each other.

It can be seen that monitoring may be carried out with marks which are outside the central aiming zone, whereby the inconvenience as regards viewing is very small. It is not even necessary that all marks be centered with respect to the optical axis of the module. It is sufficient that they define at least three points which can be moved until they coincide with respective points.

Numerous modifications of the invention are possible. As already indicated, the marks may have an aspect very different from that which has just been described and they may be located in other zones of the screen. Rather than being directly engraved on the screen, the reference marks may be drawn on a transparent film bonded onto the rear surface of the screen, as long as the parallax errors remain acceptable. The image of a reticle 54 may be super-imposed to that of the image formed on the screen, with a semi-transparent strip 56. The latter solution has the advantage of enabling to locate the reticle and the image formed on the screen exactly at the same distance of the input lens of the daylight viewing and aiming device 10. The reticle may be lighted with a light having a specific colour, for better differentiating it from the image formed on the screen.

Figure 4:
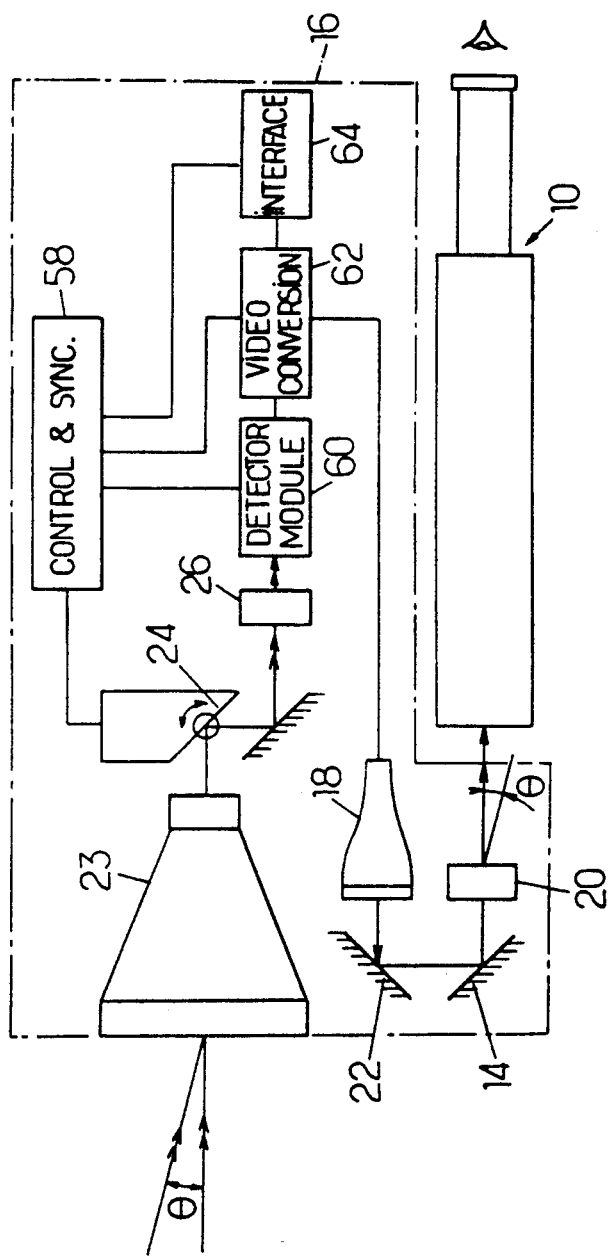
FIG. 4 is an over-all view schematically indicating a possible arrangement of the components of the system of FIG. 1 in space.
Figure 3:
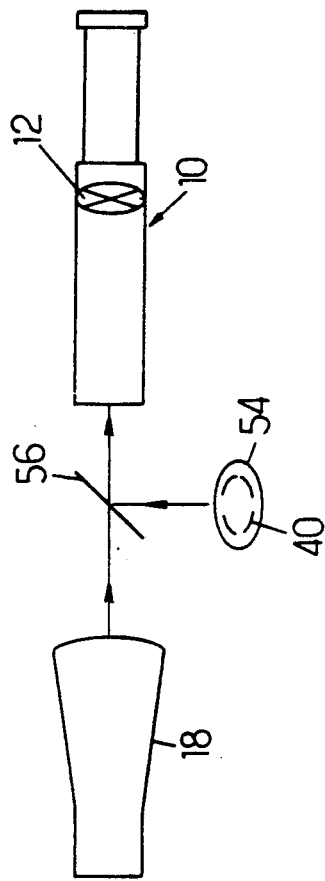
FIG. 3, similar to a portion of FIG. 1, illustrates a modification of the reference marks.

The elements of the device may be assembled as indicated on FIG. 4, where the components exactly corresponding to those already indicated in FIG. 1 are designated by the same reference numeral. The infra-red rays are indicated by double arrow head while the visible rays are indicated by a single arrow head.

The night vision module 16 which may be fixed on the daylight viewing device 10 again includes an afocal input system 23. A control and synchronisation electronic unit 58 includes a time base and means for controlling the motor which actuates the scanning mirror 24. The ingra-red focussing optical system 26 forms an image of the field on a detector module 60 including the infra-red detector and its circuits for output toward a video conversion electronic board 62 which includes elements 34, 46 and 48 of FIG. 1. An operator interface 64 associated with the electronic board comprises the manually controlled elements enabling to center the inlaid marks again. After centering harmonisation has been achieved i.e. the angle of the output optical axis with the geometrical axis and the angle of the input axis of the module with the geometrical axis have the same value $\theta$.

I claim:

1. Night vision module adaptable as an input stage on a daylight viewing and aiming device for constituting a system operational during night, comprising:
   an infra-red imaging unit;
   a unit for reproducing an image of the field of view of the imaging unit on a screen for display in the input field of a daylight viewing and aiming device, said screen having fixed reference marks formed thereon out of a central portion of said field of view;
   electronic means for inlaying, in the image of the field of view on said screen, a plurality of marks having a predetermined position with respect to an optical axis of the night vision module, out of a central aiming zone of said field, said marks being so located as to be centered with respect to the fixed reference marks when the module is harmonised; and
   further means for adjusting the location of the image of the field of view on the screen, whereby the inlaid marks may be centered with respect to the reference marks.

2. Module according to claim 1, wherein the screen consists of the bottom wall of a cathode ray tube provided with line and frame scanning means, the further means for controlling the position of the image consist of means for shifting in the line direction and in the frame direction.

3. Module according to claim 1, wherein said reference marks are engraved on one of the front and rear surfaces of said screen.

4. Module according to claim 1, wherein said reference marks are formed on an element which is distinct from the screen and attached thereto.

5. Module according to claim 1, wherein said reference marks are carried by a reticle whose image is formed on the screen by a semi-reflecting strip.

6. Module according to claim 1, wherein said reference marks and inlaid marks are angularly offset with respect to each other around the optical axis of the module.

7. A viewing and aiming system comprising a daylight viewing and aiming device provided with a central aiming reticle and a night vision module adaptable as an input stage on said daylight viewing and aiming device, said night vision module having:
   an infra-red imaging unit;
   a unit for reproducing an image of the field of view of the imaging unit on a screen for display in the input field of view of the daylight viewing and aiming device, said screen having a plurality of fixed reference marks formed thereon out of a central portion of said field view, said screen being devoid of central aiming reticle;
   electronic means for inlaying, in the image of the field of view on said screen, a plurality of marks having a predetermined position with respect to an optical axis of the night vision module, out of a central aiming zone of said field, said marks being so located as to be centered with respect to the fixed reference marks when the module is harmonised; and
   further means for adjusting the location of the image of the field of view on the screen, whereby the inlaid marks may be centered with respect to the reference marks.

* * * * *